United States Patent [19]

Franken et al.

[11] Patent Number: 5,051,052
[45] Date of Patent: Sep. 24, 1991

[54] AIRCRAFT TRACTOR WITHOUT TOW-BAR

[75] Inventors: Wilhelm Franken, Wesel; Dieter Pohé, Gelsenkirchen; Lars T. Michaelsen, Herdecke, all of Fed. Rep. of Germany

[73] Assignee: Man Gutehoffnungshütte Aktiengesellschaft, Oberhausen, Fed. Rep. of Germany

[21] Appl. No.: 515,111

[22] Filed: Apr. 27, 1990

[30] Foreign Application Priority Data

Apr. 28, 1989 [DE] Fed. Rep. of Germany ..... 89107730

[51] Int. Cl.$^5$ .............................................. B64F 1/22
[52] U.S. Cl. .................................. 414/428; 414/429; 244/50; 180/904
[58] Field of Search .......................... 180/904; 244/50; 414/426, 427, 428, 429, 430, 458, 459, 589, 590, 563, 546, 474, 476, 537; 280/402

[56] References Cited

U.S. PATENT DOCUMENTS

| 2,732,088 | 1/1956 | Arnot | 414/428 |
| 2,877,911 | 3/1959 | Arnot | 414/428 |
| 4,375,244 | 3/1983 | Morin | 414/429 X |
| 4,632,625 | 12/1986 | Schuller et al. | 414/429 |
| 4,810,157 | 3/1989 | Schopf | 414/429 |
| 4,836,734 | 6/1989 | Pollner et al. | 414/430 |
| 4,911,603 | 3/1990 | Pollner et al. | 414/428 |
| 4,911,604 | 3/1990 | Pollner et al. | 414/428 |

FOREIGN PATENT DOCUMENTS

| 3327629 | 2/1985 | Fed. Rep. of Germany | 244/50 |
| 8706542 | 11/1987 | PCT Int'l Appl. | 180/904 |
| 8805399 | 7/1988 | PCT Int'l Appl. | 244/50 |

Primary Examiner—Frank E. Werner
Attorney, Agent, or Firm—McGlew & Tuttle

[57] ABSTRACT

The present invention pertains to an aircraft tractor without tow-bar. The arrangement avoids relative movement between the nose wheel of the aircraft and the tractor lifting platform by making the lifting platform (24) rotatable around a longitudinal axis (30) of the chassis, which axis is horizontal when the chassis is extended, and by making displaceable the transverse tow arms (38) and/or the holders (42) at right angles to this longitudinal axis (30). The tires of an oblique nose wheel landing gear of an aircraft being towed in a curve are handled very gently, because the tractor parts (24, 38, and 42) that are in contact with the nose wheel landing gear are able to follow the movements of the nose wheel landing gear and to adjust to its instantaneous position.

6 Claims, 7 Drawing Sheets

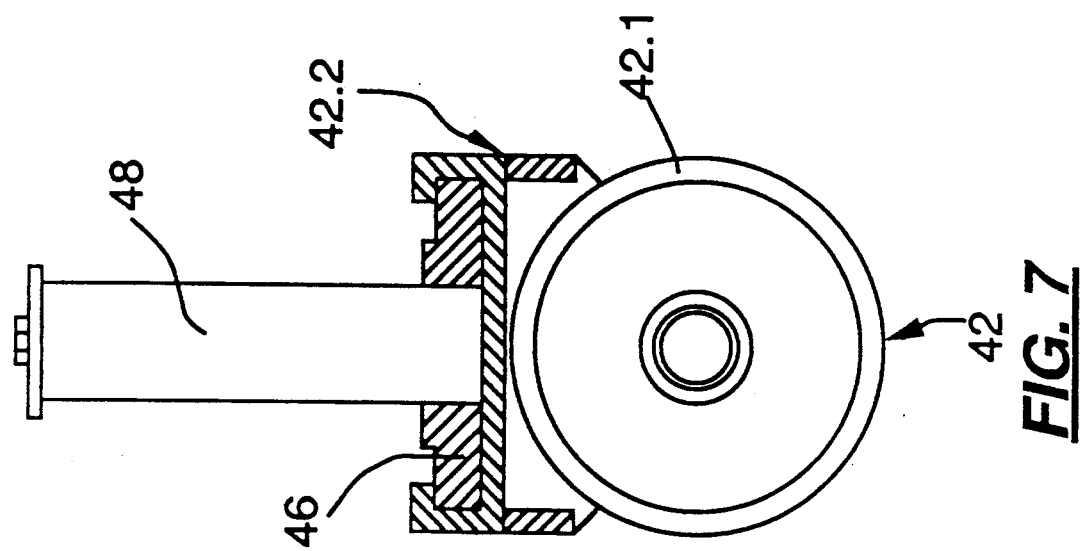
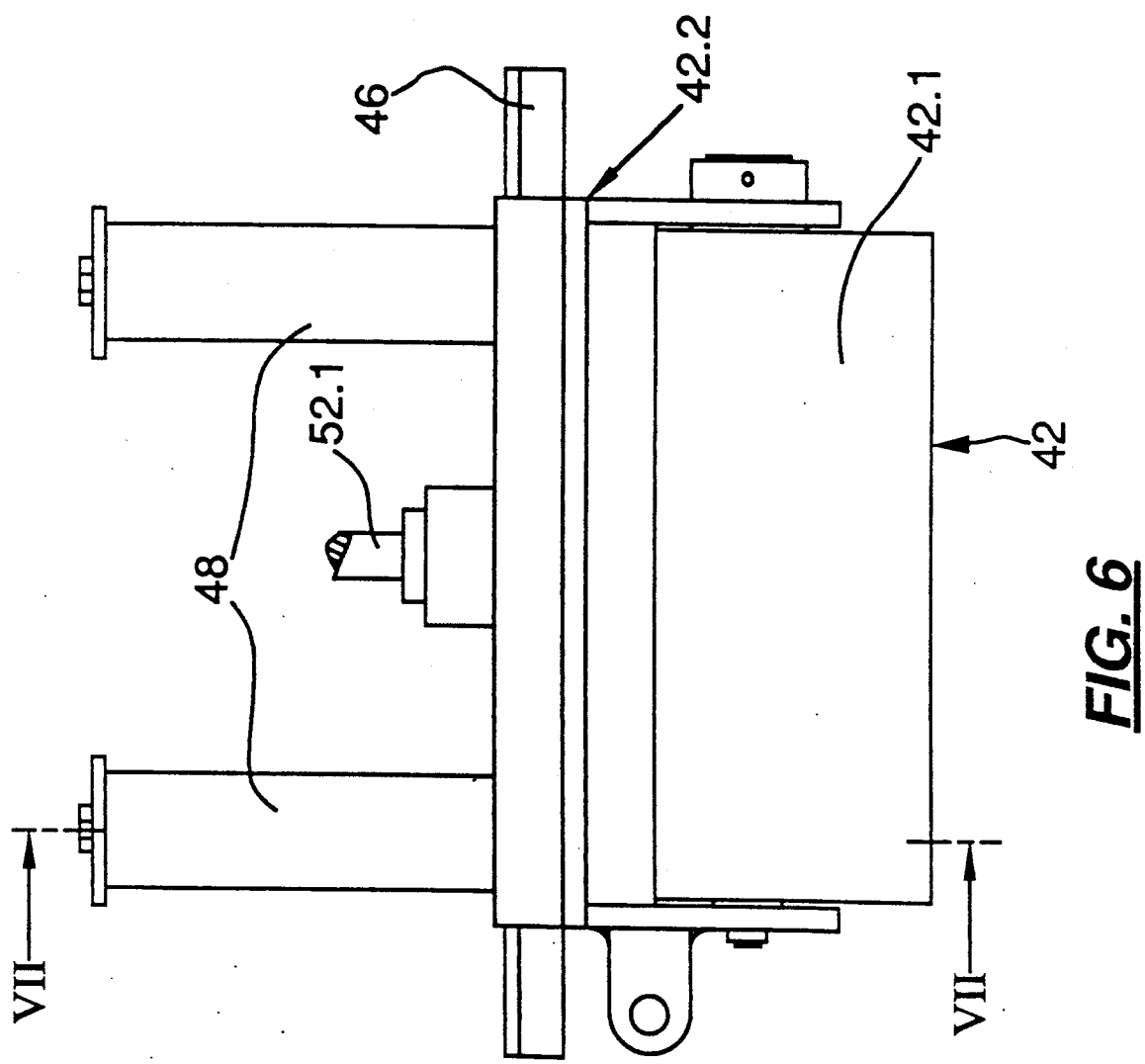

AIRCRAFT TRACTOR WITHOUT TOW-BAR

FIELD AND BACKGROUND OF THE INVENTION

The present invention pertains to an aircraft tractor without a tow-bar, comprising a chassis, which may be divided and whose front wheel axles are mounted on a front part and whose rear wheel axle journals are mounted on a rear part. The rear part is forked by a recess for receiving the nose wheel landing gear. The rear part is hinged to the front part via a single articulated axle that is parallel to the rear wheel axle. On this front part, possibly behind the articulated axle, a lifting platform is arranged at the front end of the chassis recess, wherein said lifting platform has a support surface for lifting up the nose wheel landing gear. The support surface slopes downward when the chassis is folded and is horizontal when the chassis is extended. Two mirror image tow arms are arranged at the rear end of the chassis recess. The tow arms can be moved both from a longitudinal position on each side of the recess (to provide a nose wheel gear path) to a transverse position for reaching behind a nose wheel gear, and in the forward direction. At least one nose wheel holder, which is arranged at the front end of the chassis recess above the lifting platform, is provided which can be moved in the rearward direction.

In a tractor of this class, which is known from DE-OS/PS 36,16,807 (Schopf/MAN), the lifting platform provided as a platform for receiving the nose wheel landing gear of the aircraft is connected rigidly to the front part of the chassis, and is designed, e.g., in one piece with the front part of the chassis. The two tow arms and the two corresponding holding arms, which hold down the two wheels of the nose wheel landing gear on the support surface of the lifting platform, are immobile in their temporary or permanent horizontal transverse position perpendicularly to the longitudinal axis of the tractor.

As a consequence of this arrangement of the lifting platform as well as the tow and holding arms (holders), one nose wheel is raised on one side and the load on the other nose wheel increases on the rigid lifting platform during a curving movement of the tractor. This occurs during turning or curving movement when the lifting platform has picked up an inclined two-wheel nose landing gear of an airplane being towed. When this occurs the grasping and holding arms, on one hand, and the nose wheels, on the other hand, perform relative movements, which are associated with great friction.

Another drawback is loss of a primary advantage of the prior-art tractor, according to which the nose wheel tires of the aircraft are not subjected to any unusual deformation either when grasped or when lifted, because the lifting platform creates a second bottom corresponding to the road surface, on which the nose wheels are flexed naturally, in the case of aircraft with inclined nose wheel landing gear.

SUMMARY AND OBJECT OF THE INVENTION

It is an object of the present invention therefore to provide a tractor for towing aircraft without a tow-bar, which offers the above-mentioned advantage even in the case of aircraft with inclined nose wheel landing gear by completely or almost completely avoiding the relative movements between both the nose wheel landing gear picked up and the lifting platform as well as the tow and holding arms.

This task is accomplished according to the present invention in a tractor of the type described in the introduction by arranging the lifting platform rotatably around a longitudinal axis of the chassis when the chassis is in the extended position and mounting displaceably the transversely located tow arms and/or holders (holding arms) at right angles to this longitudinal axis.

It is thus advantageously achieved that during the rotation of the wheel pair of an inclined nose wheel landing gear around a horizontal axis that intersects the wheel axis perpendicularly, as occurs during the movement of the tractor in a curve, the wheel pair causes the lifting platform supporting it to turn along with it, so that no relative movement occurs; and that each nose wheel inclined to the side is able to displace the tow and holding arm (in a direction perpendicular to the horizontal axis) that is in contact with it, which reduces the mutual friction. The tires even of an inclined nose wheel landing gear are therefore handled very gently even while the tractor is moving in a curve.

In a preferred embodiment of the tractor according to the present invention, the axle defining the axis of rotation of the lifting platform is nonrotatably connected to a transverse, two-armed rocking lever, each of whose two free ends are supported by a single-acting hydraulic cylinder, which [latter] are connected to each other by a hydraulic line that can be throttled. In conjunction with the rocking lever, this hydraulic system adjusts the rotary movements of the two wheels of the nose wheel landing gear with the lifting platform loaded with said wheels and reduces their unintended rotation in the load-free state during throttling with the chassis in the extended position.

In the preferred embodiment, the tow arms reaching behind the nose wheels each have a hollow roller rolling on the nose wheel. A cylinder of a single-acting hydraulic piston cylinder with pivoting piston rod is rigidly connected to the hollow roller, is arranged coaxially; and these two cylinders are connected to each other via a hydraulic line. The two hydraulic cylinders and their mutual connection cause the hollow rollers of the transverse tow arms to be displaced by the laterally tilting nose wheels in the same direction and by an equal amount while the tow arms reach behind the nose wheel tires, and the nose wheels themselves, together with the lifting platform, tilt to the side in the same direction and by an equal amount during the movement in a curve of the tractor that has picked up an inclined nose wheel landing gear. The mutual friction of the nose wheel tires and tow arm hollow rollers is thus limited essentially to one rotary contact point.

In the preferred embodiment, the nose wheel holder has a roller rolling on the nose wheel. The roller has a forked axle holder mounted on a straight transverse guide that can be moved in the rearward direction between two parallel longitudinal guides by means of the two parallel longitudinal guides and one, at least single-acting hydraulic cylinder, and in the case of two holders, two single-acting hydraulic cylinders connected by a hydraulic line are provided. This design and arrangement of the holder has the same effect on the mutual friction of the holder and the nose wheel as the selected design and arrangement of the tow arms which were characterized above. Whether only a single holder occupying the entire width of the chassis recess is present for both nose wheels or whether two separate holders are provided for one nose wheel each is irrelevant. The connection of the cylinders, which is provided in the case of two holders, in which case the number of cylinders also equals two, causes the two holders to be displaced, when they are in contact with the nose wheel tires, in opposite directions and in parallel to the longitudinal axis of the tractor, but by equal amounts by the nose wheels which are moved forward and backward during their movement in the curve. This guarantees that both holders are in contact with the two nose wheels at all times. In this connection, the two longitudinal guides of the holder prevent tight movement of the piston of the hydraulic cylinder arranged between them when the holder comes eccentrically into contact with the nose wheel landing gear or the associated nose wheel.

In the preferred embodiment, the two longitudinal guides of the holder transverse guide are arranged on a bridge crossing over the chassis recess, which is acted on by two hydraulic cylinders for moving the nose wheel holder. This bridge at the front end of the recess makes it possible to arrange one or two holders at the most suitable point without direct connection of the transverse and longitudinal guides to the chassis.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

BRIEF DESCRIPTION OF THE DRAWINGS

In the drawings:

FIG. 6 is a top view of one half of the section shown in FIG. 5;

FIG. 7 is a vertical longitudinal sectional view taken along line VII—VII in FIG. 6.

DETAILED DESCRIPTION OF THE PREFERRED EMBODIMENT

Figure 1:
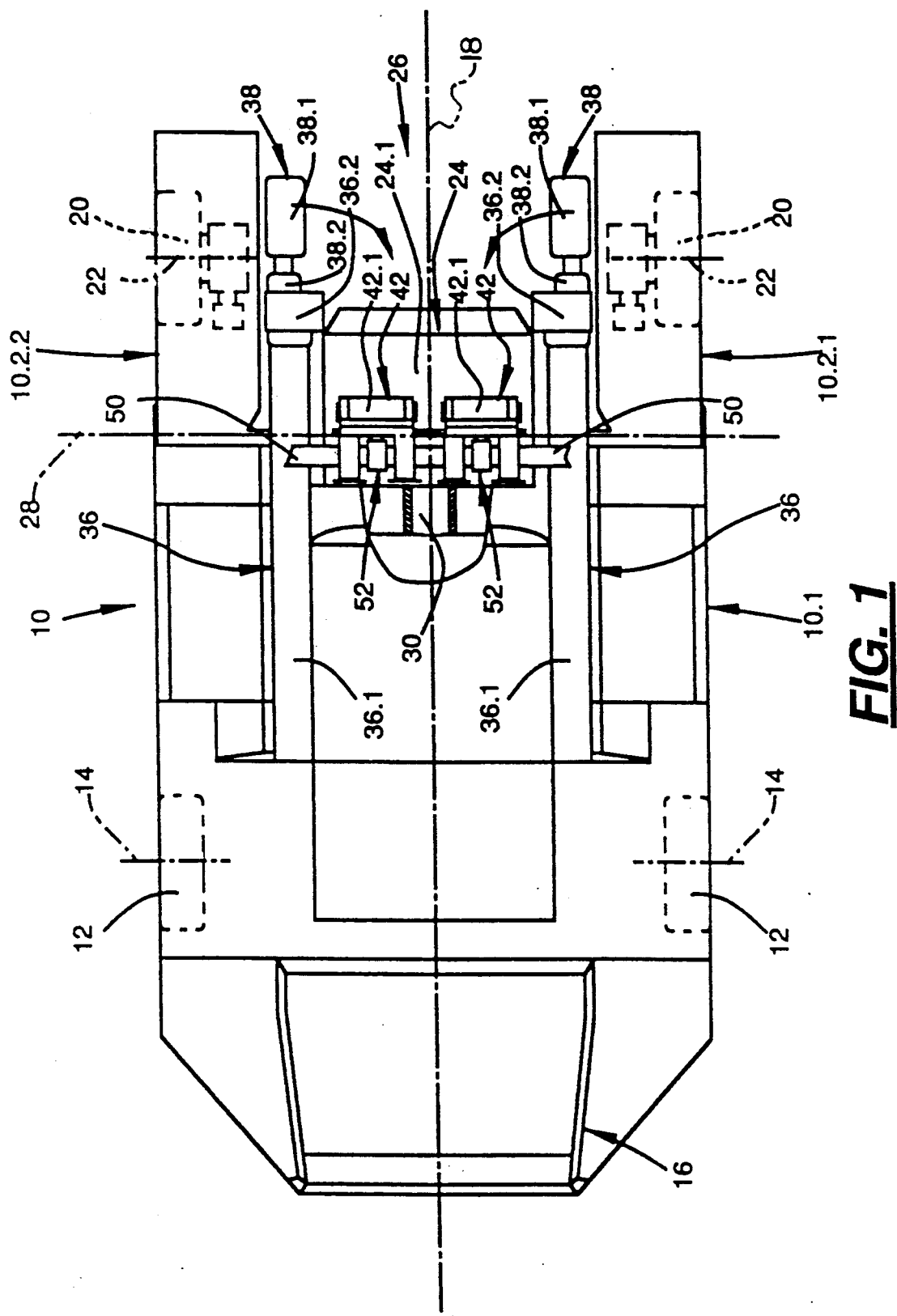
FIG. 1 is a top view of a preferred embodiment of the tractor construction according to the invention with two arms in a longitudinal position.
Figure 2:
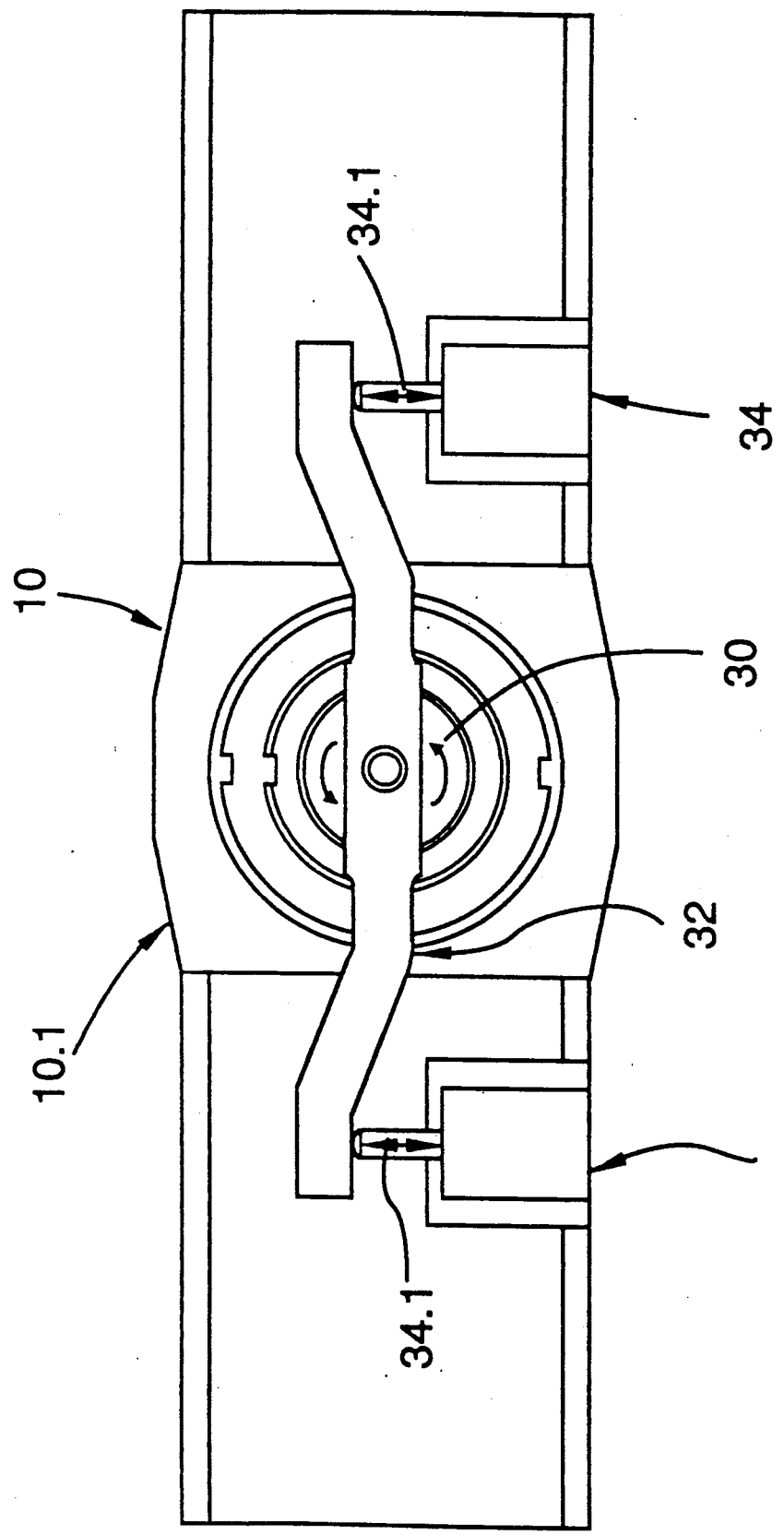
FIG. 2 is a front view showing in detail a section of the tractor, broken off on both sides.

In the embodiment shown, the tractor according to the present invention has a generally two-part chassis 10, on whose larger, uniform front part 10.1 two drivable and steerable front wheels 12 with horizontal axes of rotation 14 are mounted, and a cabin 16 for the tractor operator is provided in front. The rear part 10.2 of the chassis consists of a left half 10.2.1 and a right half 10.2.2, which are of identical design but mirror images relative to a vertical symmetry plane containing the longitudinal axis 18 of the tractor, which plane is perpendicular to a flat, imaginary road surface of the tractor. Each half of the chassis rear part 10.2 has a drivable rear wheel 20 which, together with the opposite second rear wheel, rotates around the same imaginary horizontal transverse axis 22 which is perpendicular to the vertical symmetry plane containing the longitudinal axis 18. This relationship also applies to the axes of rotation 14 of the straightened front wheels 12, and is embodied by two axle journals of the rear wheels 20 (not shown).

At its rear end, said chassis front part 10.1 has a lifting platform 24, which nearly touches the road surface of the tractor during rotation of the front part around the aligned axes of rotation 14 of the front wheels, so that the nose wheel landing gear of the aircraft to be towed can be rolled onto the platform of the lifting platform, which platform is separate from the road surface. Consequently, the lifting platform 24, which is pivotable around the aligned axes of rotation 14, extends in the direction of the longitudinal axis 18 of the tractor up to the two rear wheels 22 in the halves 10.2.1 and 10.2.2, respectively of the chassis rear part, which laterally delimit a recess of this forked rear part, this recess is open to the rear as well as at the top and bottom.

The front part 10.1 and the rear part 10.2 of the chassis are hinged together along a horizontal articulated axle 28, which crosses said longitudinal axis 18 of the tractor perpendicularly and extends horizontally approximately at the height of an upwardly pointing, flat support surface 24.1 of the lifting platform 24. The articulated axle 28 is located approximately at the front end of the horizontal support surface 24.1, which drops in the rearward direction due to the folding of the chassis 10 and is horizontal when the platform is raised by extending the chassis.

The lifting platform 24 is provided, in the middle of its front end, with an axle journal 30 of large diameter serving as a shaft, which axle journal is horizontal when the chassis 10 is extended and is bisected by the vertical plane containing the longitudinal axis 18 of the tractor. The center of the transverse rocking lever 3, whose two arms, which are bent at right angles, are supported at their free ends by the piston rod 34.1 of one upright hydraulic cylinder 34 each on the chassis front part 10.1, is arranged nonrotatably at the front end of axle journal 30 mounted rotatably on the chassis front part 10.1. The two hydraulic cylinders 34 are connected to each other by a hydraulic line that can be throttled (this connection is not shown). This arrangement prevents the nonloaded lifting platform 24 from performing any unintended rotary movement out of its normal horizontal position during throttling and, without throttling, the lifting platform 24, which is loaded by the nose wheel landing gear of an aircraft being towed in a curve, whose nose wheels project obliquely in the forward direction, is able to perform a rotary movement adapting to the lateral inclination of the nose wheel landing gear, which rotary movement keeps the tractor free from corresponding loads.

Figure 3:
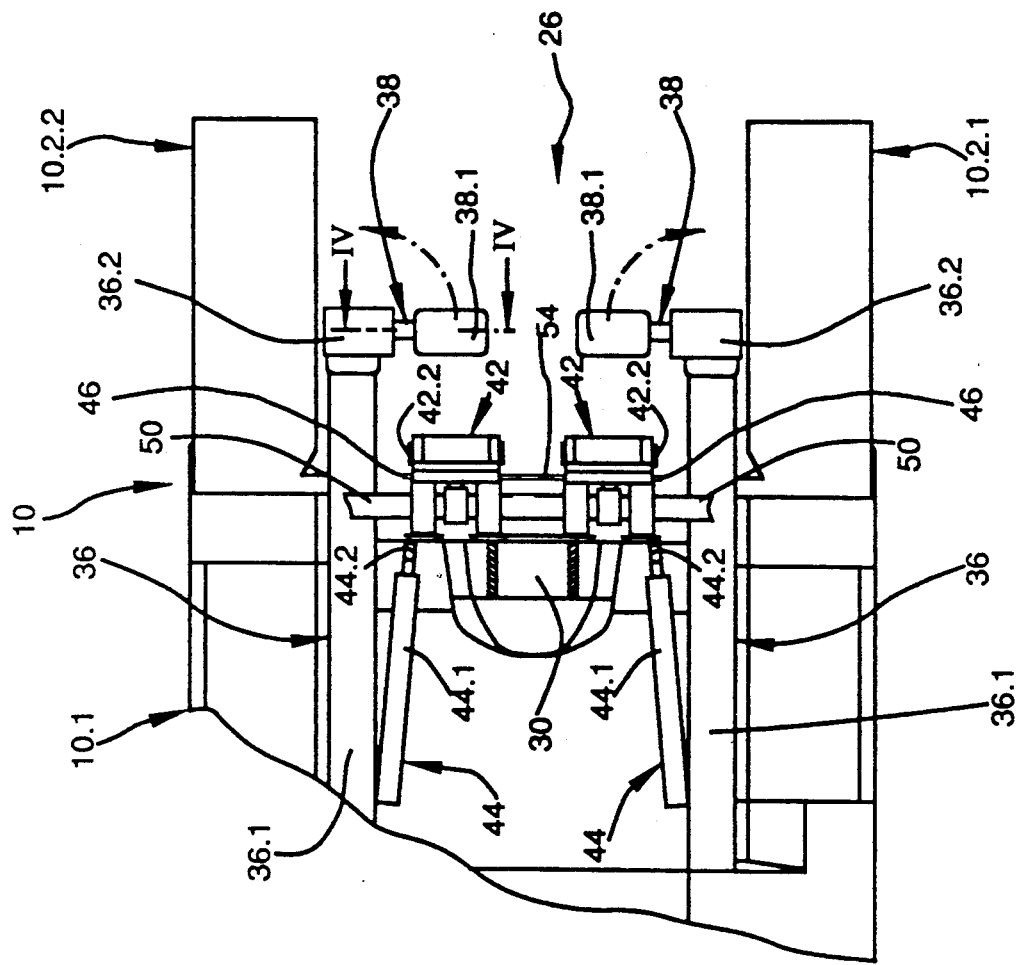
FIG. 3 is a top view partly broken away the tractor with tow arms in the transverse position.
Figure 4:
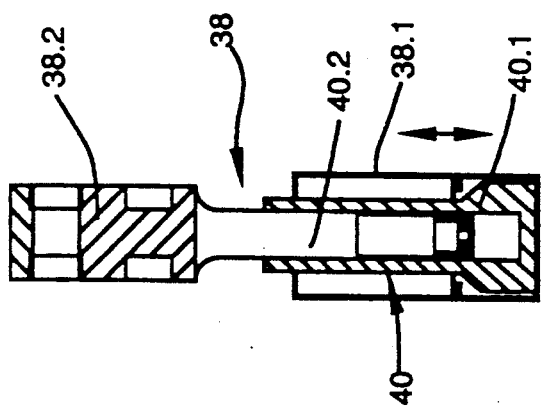
FIG. 4 is a longitudinal sectional view through a tow arm along line IV—IV in FIG. 3.
Figure 5:
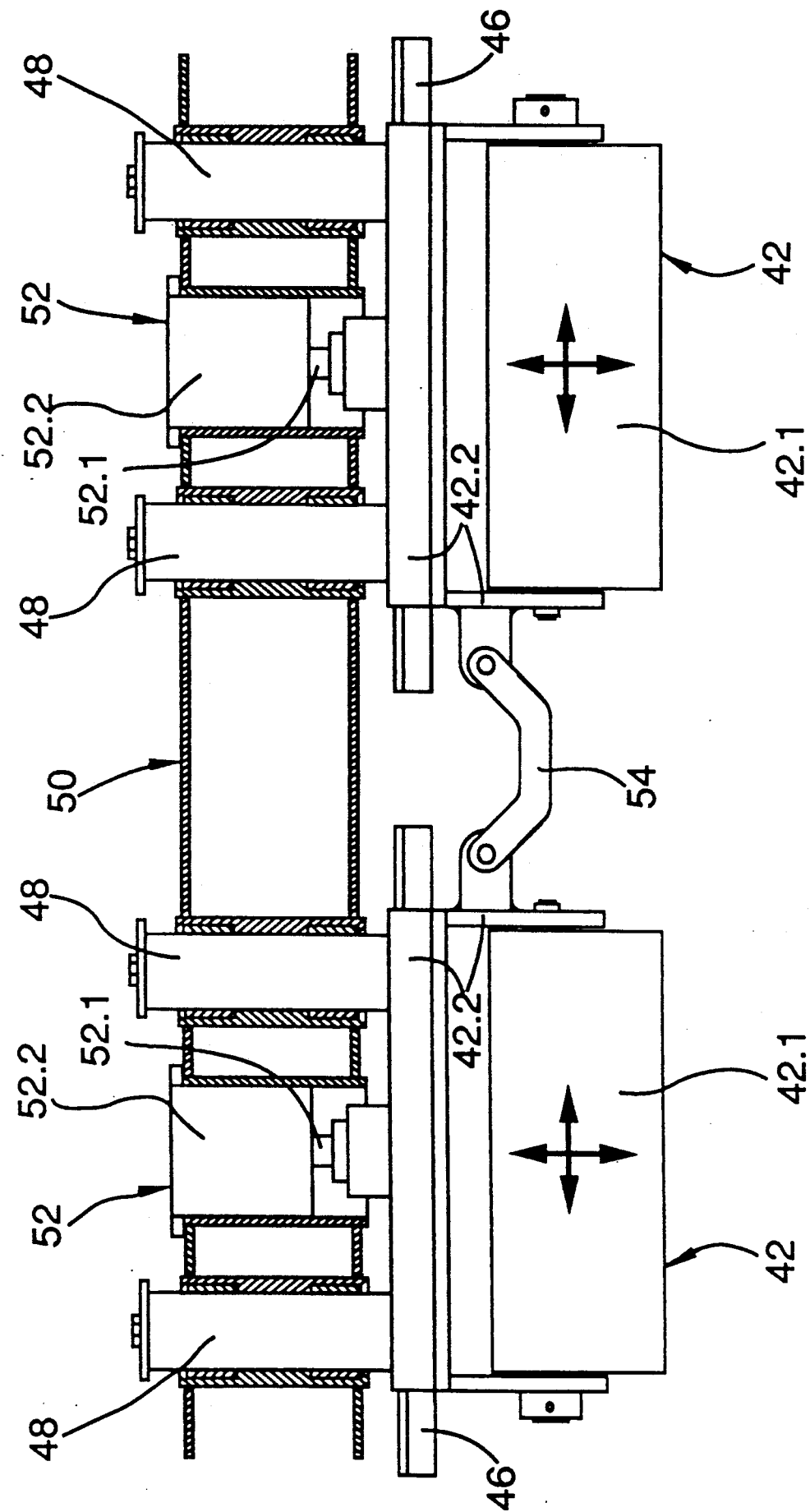
FIG. 5 is a horizontal sectional view showing in detail another section of the tractor broken off on both sides.
Figure 8:
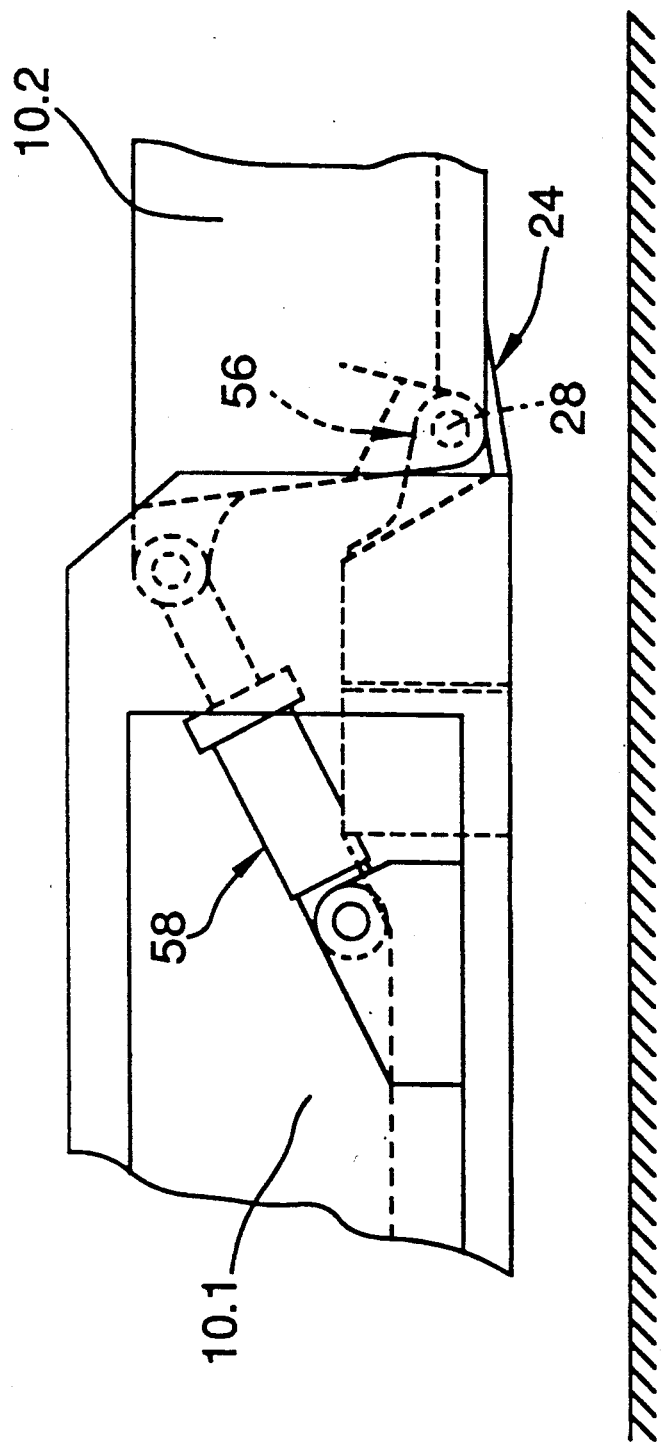
FIGS. 8 and 9 show a side view and a top view, respectively, of the articulation in the chassis.
Figure 9:
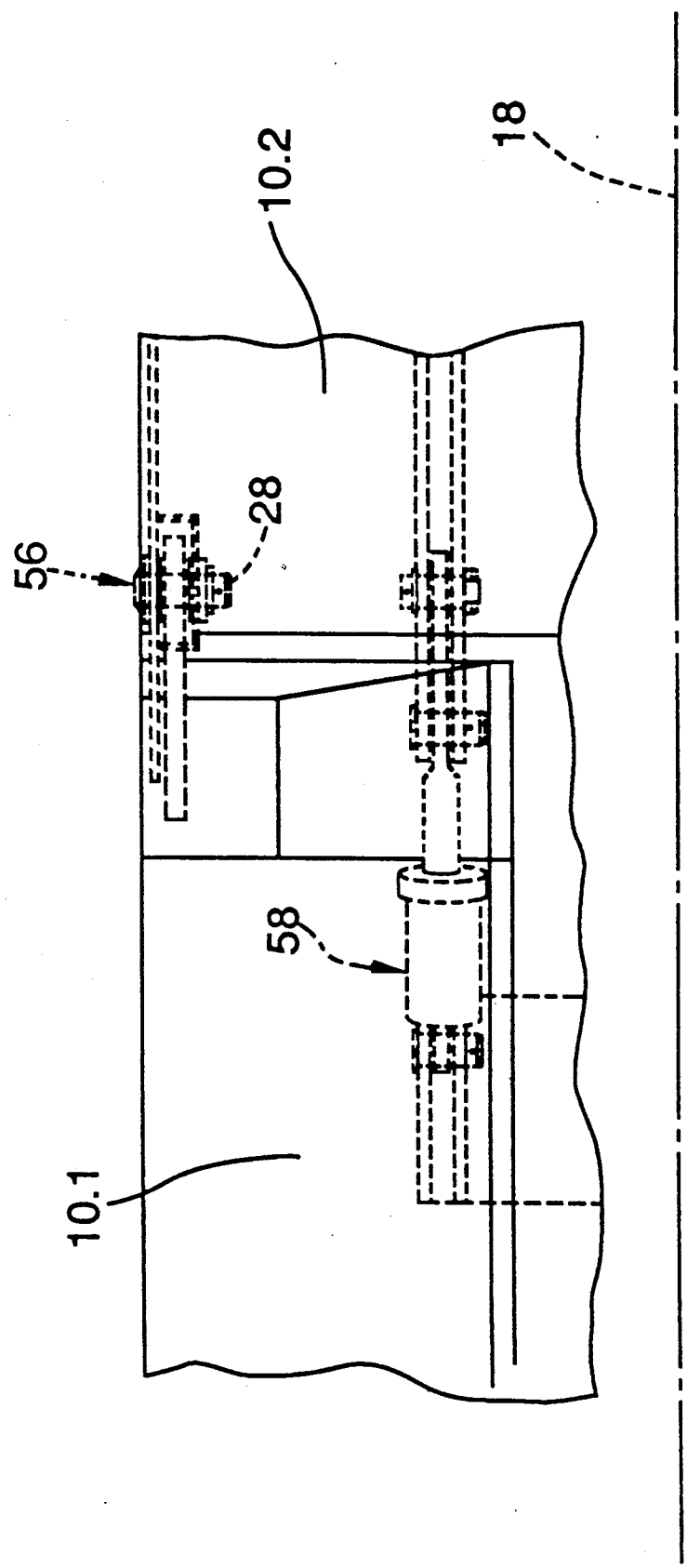

Beside the two halves of the chassis rear part 10.2, i.e., laterally from the lifting platform 24, two parallel, approximately horizontally arranged telescoping rods 36, whose length is adjustable by means of hydraulic cylinders (not shown), extend into the chassis recess 26. The part 36.1 of each telescoping rod which is not adjustable in length is fastened to the chassis front part 10.1 or is preferably hinged therewith its front end. The longitudinally displaceable part 36.2 of each telescoping rod is provided at its rear end with a tow arm 38 rotatable around a vertical axis, which [tow arm]can be pivoted in the directions of the arrows between a longitudinal position shown in FIG. 1 next to the adjacent half of the chassis rear part 10.2 and a vertical transverse position shown in FIG. 3. The two tow arms 38 are aligned with each other in their always horizontal transverse positions.

Each tow arm 38 is arranged transversely displaceably relative to the longitudinal axis 18 of the tractor due to the fact that it is provided with a circularly cylindrical hollow roller 38.1, which receives coaxially a hydraulic cylinder 40 and is mounted rotatably together with the shell 40.1 of the cylinder on a piston rod 40.2, which is extended by a thickened end section 38.2 of the tow arm 38, which arm is hinged, as was described, to the associated telescoping rod 36. The end section 38.2, like the adjoining piston rod 40.2, is provided with a hollow space for the flow of hydraulic fluid, which leaves and enters shell 40.1 at the front side of the piston rod 40.2. The two hydraulic cylinders 40 are connected to each other via lines connected to the end sections 38.2 of the tow arms 38, which lines are laid in the telescoping rods 36, so that, as in the two hydraulic cylinders 34, hydraulic fluid can be transferred from one cylinder into the other, so that the two hollow rollers 38.1 of the transverse tow arms are displaced by the nose wheels in the same horizontal direction and by the same amount.

At the front end of the chassis recess 26, a pair of nose wheel holders 42 is arranged, and these holders can be moved in parallel in the rearward direction up to the end of the lifting platform 24 by means of two mirror-image hydraulic cylinders 44, whose shells 44.1 are fastened to the longitudinally nondisplaceable parts 36.1 of the telescoping rods. Each holder 42, which acts on the front upper fourth of the circumference of a nose wheel, has a circular cylindrical roller 42.1, whose horizontal axis of rotation, which crosses the longitudinal axis 18 of the tractor perpendicularly, is mounted on a forked, essentially U-shaped roller axle holder 42.2, which is guided in the transverse direction by means of a horizontal rail 46. This transverse guide is guided doubly in the longitudinal direction due to the fact that parallel bolts 48 fastened perpendicularly at the ends of the rail 46 are mounted longitudinally displaceably on a horizontal bridge 50, which bridge in turn is mounted displaceably with two ends on one each of the two longitudinally displaceable parts 36.1 of the telescoping rods due to the fact that the piston rods 44.2 of the hydraulic cylinders 44 act at the bridge on two sides of the pair of nose wheel holders 42. Between two longitudinally guided bolts 48, which are associated with the same holder 42, a small hydraulic cylinder 52 is arranged on the bridge 50, and the piston rod 52.1 of this small hydraulic cylinder acts centrally, in parallel to the bolts, on the associated roller axle holder 42.2, which is connected to the adjacent holder 42.2 by means of a connecting rod 54 bent approximately in the shape of a V for joint horizontal reciprocating movement. The two shells 52.2 of the two hydraulic cylinders 52, which are rigidly attached to the bridge, are connected to each other by a hydraulic line (not shown), which causes the two nose wheel holders 42 to be moved always by the same amount but in opposite directions relative to the bridge 50.

The front part 10.1 and the rear part 10.2 of the chassis are hinged together by the left half 10.2.1, on one hand, and the right half 10.2.2, on the other hand, of the chassis rear part to form a hinge 56 each, whose pins are aligned and define the articulated axle 28.

To fold and extend said chassis 10, while lowering or raising the articulated axle 28, a pair of hydraulic cylinders 58, which extend on both sides of the chassis front part 10.1 and are hinged in front to the front part and in the rear to the chassis rear part 10.2, are provided, so that the upper hydraulic cylinders 58 act there approximately above the articulated axle 28.

While a specific embodiment of the invention has been shown and described in detail to illustrate the application of the principles of the invention, it will be understood that the invention may be embodied otherwise without departing from such principles.

What is claimed is:

1. An aircraft tractor without tow-bar, comprising: a divided chassis having a longitudinal axis including a front part and a rear part hingedly connected to said front part about a single transverse articulated axle and having motive means therefor, said rear part defining a recess for receiving the nose wheel landing gear of aircraft; a front transverse wheel axle mounted to said front part; a rear wheel axle mounted to said rear part via rear wheel journals, said rear wheel axle being substantially parallel to said single articulated axle; a lifting platform including motive means and connected to said front part and extending to a front end of said recess, said lifting platform having a support for supporting nose landing gear of the aircraft; first and second tow arms connected to the rear part of said divided chassis extending to a rear end of said recess, one of said first and second tow arms being provided on each side of said rear end of said recess, said tow arms each being moveable forwardly and from a longitudinal position to a transverse position, each reaching behind a nose wheel; first and second nose wheel holders connected to said divided chassis positioned at a front end of said chassis recess, above said lifting platform, and moveable in a rearward direction; rotation means connected to said lifting platform and connected to said front part for providing rotation between said platform and said front part about said longitudinal axis; and, displacement means connected to said tow arms and connected to said nose wheel holder for providing displacement of said tow arms and said nose wheel holders perpendicular to said longitudinal axis.

2. An aircraft tractor without tow-bar comprising: a chassis having a longitudinal axis with a rear part defining a recess for receiving the nose wheel landing gear of the aircraft; a front transverse wheel axle mounted to said chassis adjacent a front end of said chassis; a rear wheel axle mounted to said chassis adjacent a rear end of said chassis; a lifting platform including motive means connected to said chassis and extending into a front end of said recess, said lifting platform having a support for supporting nose landing gear of the aircraft; lifting means connected to said chassis and connected to said platform for moving said platform vertically between a lowered position and a lifted position; first and second tow arms connected to the rear part of said chassis extending to a rear end of said recess, one of said first and second tow arms being provided on each side of said rear end of said recess, said tow arms each being moveable forwardly and from a longitudinal position to a transverse position for each reaching behind a nose wheel; first and second nose wheel holders connected to said chassis, said nose wheel holders being positioned at a front end of said chassis recess, above said lifting platform, said first and second wheel holders being moveable in a rearward direction; rotation means connected to said lifting platform and connected to said chassis for providing rotation about said longitudinal axis, between said lifting platform and said chassis; and, displacement means connected to said tow arms and connected to said nose wheel holders for providing displacement of said tow arms and said nose wheel holders in a direction perpendicular to said longitudinal axis.

3. An aircraft tractor according to claim 2, wherein said rotation means includes an axle connected non-rotatably to a transverse, two-arm rocking lever, said rocking lever having two free ends, each free end being supported by a single-acting hydraulic cylinder, said hydraulic cylinders being connected to each other via a hydraulic line and throttling means connected to said hydraulic line for throttling said hydraulic line.

4. An aircraft tractor according to claim 2, wherein said tow arms have ends with hollow rollers, said hollow rollers adapted to roll on one of the nose wheels, a shell of a single acting hydraulic cylinder is rigidly attached to said hollow roller, arranged coaxially with said hollow roller and a pivotable piston rod cooperating with said shell.

5. An aircraft tractor according to claim 2, wherein said nose wheel holders include a roller adapted to engage a nose wheel for rolling on said nose wheel, said nose wheel holder rollers each having a forked axle holder mounted on a substantially straight transverse guide, said forked axle holders being moveable in a rearward direction by means of two parallel longitudinal guides and at least a single acting hydraulic cylinder positioned between said longitudinal guides, said single acting hydraulic cylinders being connected to each other by a hydraulic line.

6. An aircraft tractor according to claim 5, wherein said two longitudinal guides are arranged on a bridge crossing said chassis recess, two hydraulic cylinders being positioned on said bridge, each for moving one of said nose wheel holders.

* * * * *